United States Patent [19]

Okamoto

[11] Patent Number: 5,048,961
[45] Date of Patent: Sep. 17, 1991

[54] PHASE MODULATED FIBER-OPTIC GYROSCOPE FOR MEASURING THE ANGULAR VELOCITY OF A MOVING OBJECT

[75] Inventor: Kenji Okamoto, Osaka, Japan

[73] Assignee: Sumitomo Electric Industries, Ltd., Osaka, Japan

[21] Appl. No.: 489,556

[22] Filed: Mar. 7, 1990

[30] Foreign Application Priority Data

Mar. 8, 1989 [JP] Japan .................................. 1-57635
Mar. 8, 1989 [JP] Japan .................................. 1-57636
Mar. 8, 1989 [JP] Japan .................................. 1-57637

[51] Int. Cl.$^5$ .......................................... G01C 19/72
[52] U.S. Cl. .......................................... 356/350
[58] Field of Search .............................. 356/350, 345; 250/227.27

[56] References Cited

U.S. PATENT DOCUMENTS 4,765,739  8/1988  Koizumi et al. ................... 356/350
4,796,993  1/1989  Sonobe et al. .
4,863,273  9/1989  Nishiura .............................. 356/350

FOREIGN PATENT DOCUMENTS 0185385  6/1986  European Pat. Off. .
2618545  1/1989  France .
0135816  7/1985  Japan .
0124817  6/1986  Japan .

OTHER PUBLICATIONS

K. Böhm et al., "Direct Rotation-Rate Detection With A Fibre-Optic Gyro By Using Digital Data Processing", Electronic Letters, vol. 19, No. 23, Nov., 1983, pp. 997-999.
Carl Cranz Gesellschaft e.V., Oberpfaffenhofen, lehrgang: "Sensoren in Inertialen Hess-und Navigationssystem", in Braunschweig, DE, Oct. 17-21, 1988.

Primary Examiner—Samuel Turner
Attorney, Agent, or Firm—Cushman, Darby & Cushman

[57] ABSTRACT

In a phase-modulated fiber-optic gyroscope having as essential components a fiber-optic cable having a sensor coil portion and a portion provided with a phase modulation device, a light-emitting device that issues coherent light, a beam splitter by which the light issuing from the light-emitting device either directly or via an optical fiber is split into two beams which are launched at opposite ends of the fiber-optic cable, a light-receiving device into which the light beams that have been transmitted through the fiber-optic cable and that emerge from opposite ends thereof are launched after they are re-combined by the beam splitter, and a synchronous detector circuit that receives the output of the light-receiving device and that detects a phase-modulated frequency component, the improvement wherein the gyroscope further includes a DC component detector that receives the output of the light-receiving device and that detects the DC component of the output, a reflected light quantity setting unit that presets the level of the reflected light H in the DC component which was reflected by the edge faces of lenses, optical fiber and other parts of the optical system and which did not pass through the sensor coil, a reflected light quantity subtracting unit that subtracts the present level of reflected light H from the output D of the DC component detector, and a division performing unit that divides the output of the synchronous detector by the output R of the reflected light quantity subtracting unit and that outputs the result of the division.

8 Claims, 7 Drawing Sheets

PHASE MODULATED FIBER-OPTIC GYROSCOPE FOR MEASURING THE ANGULAR VELOCITY OF A MOVING OBJECT

BACKGROUND OF THE INVENTION

1. Field of the Invention

This invention relates to a phase modulated fiber-optic gyroscope.

2. Prior Art

The fiber-optic gyroscope is an apparatus for measuring the angular velocity of a moving object. Monochromatic light is launched at opposite ends of a coil of many turns of a single-mode optical fiber and is transmitted clockwise and counterclockwise simultaneously, with the light emerging from one end of the coil interfering with the light emerging from the other end. If the fiber-optic coil is rotating about its own axis, a phase difference appears between the two light beams. Since this phase difference is proportional to the angular velocity of the rotation, one can determine the angular velocity of the rotation from the phase difference.

If the phase difference and angular velocity are written as $\Delta\theta$ and $\Omega$, respectively, the following relationship holds:

$$\Delta\theta = \frac{4\pi La\Omega}{c\lambda} \quad (1)$$

where L is the fiber length of the sensor coil, a is the coil diameter, c is the speed of the light in a vacuum and $\lambda$ is the wavelength of the light in a vacuum. This effect is called the Sagnac effect and is well known.

In practice, however, it is not easy to detect the phase difference $\Delta\theta$ because it contains non-rotational offsets inherent in the optical system. These offsets are subject to significant variations due to temperature changes. A further problem is that the output of a light-receiving device appears in the form of $(1+\cos\Delta\theta)$ in a fiber-optic gyroscope of the most primitive design. This results in low sensitivity and failure to detect the direction of rotation if $\Delta\theta$ is small.

To cope with these difficulties, three different types of fiber-optic gyroscopes have been proposed, which operate on the principles of frequency modulation, phase modulation and phase shift, respectively. The present invention relates to a fiber-optic gyroscope that operates on the principle of phase modulation.

Figure 1:
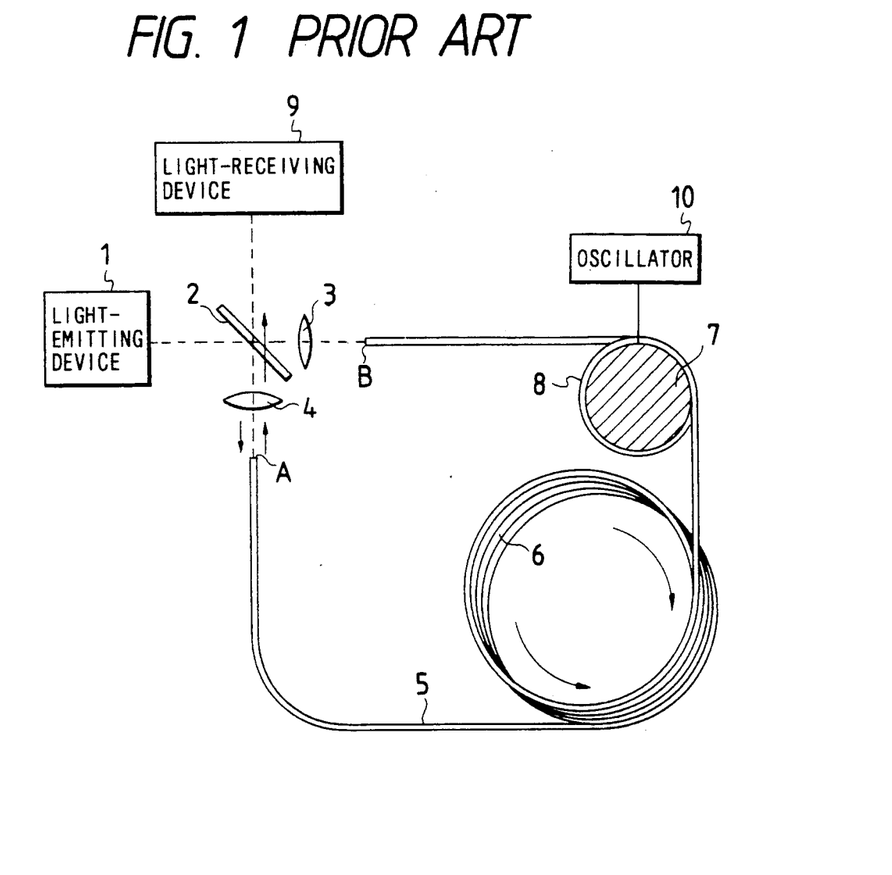
FIG. 1 shows the basic construction of a phase modulated prior art fiber-optic gyroscope.

The basic construction of a phase modulated fiber-optic gyroscope is described below with reference to FIG. 1. Phase modulation is produced from a piezoelectric device around which one end portion of the optical fiber cable in the sensor coil is wound. By picking up the first-order term of the modulated wave, the phase difference can be determined in the form of $\sin\Delta\theta$.

Coherent light issuing from a light-emitting device 1 is split into two beams by a beam splitter 2. One of the two beams is converged by a coupling lens 4 and launched into end A of an optical fiber cable 5. This beam is transmitted through the sensor coil 6 counterclockwise. The other beam is converged by a coupling lens 3, launched into end B of the optical fiber 5 and transmitted through the sensor coil 6 clockwise.

The greater part of the optical fiber cable 5 forms the sensor coil 6 and only the part close to end B is wound around the piezoelectric device to form a phase modulation device 7.

An oscillator 10 produces an oscillating voltage that causes the piezoelectric device to expand or contract. The phase modulating part 8 of the optical fiber cable is wound onto the piezoelectric device, so it will expand or contract together with the piezoelectric device to produce a light signal containing a modulated component.

The light beam transmitted clockwise through the phase modulating part 8 and the sensor coil 6 will emerge from end A, and the other beam transmitted counterclockwise through the sensor coil 6 and the phase modulating part 8 will emerge at end B. The emerging light beams are recombined by the beam splitter 2 and launched as a single beam into a light-receiving device 9, which performs square-law detection on the light of interference.

Since the phase modulation device 7 is located asymmetrically with respect to the fiber-optic cable 5, the light being transmitted clockwise is phase-modulated at a slightly different time than the light being transmitted counterclockwise. The time, $\tau$, required for the light to pass through the sensor coil 6 is given by:

$$\tau = \frac{nL}{c} \quad (2)$$

where L is the fiber length of the sensor coil 6 and n is the refractive index of the fiber core. If the phase modulation device 7 is positioned close to end B, the light being transmitted clockwise will be first phase-modulated before it is launched into the sensor coil 6. On the other hand, the light being transmitted counterclockwise passes through the sensor coil 6 before it is launched into the phase modulation device 7.

Let us write $\Omega$ for the angular frequency of a modulating signal. Since the difference in time between the phase modulation caused by the device 7 and the launching of the light into the light-receiving device 9 is $\tau$, the phase difference, $\phi$, of the modulation signal contained in the light of interference is given by:

$$\phi = \Omega\tau \quad (3)$$

As described above, the Sagnac effect introduces a phase difference of $\Delta\theta$ between the light transmitted clockwise and the light transmitted counterclockwise, and the phase modulation applied on the two light beams creates an additional phase difference of $\phi$ in the phase-modulated portion.

If the amplitude due to the action of the phase modulation device 7 is written as b, the field strength $E_R$ of the light transmitted clockwise is given by:

$$E_R = E_o \sin\left(\omega t + \frac{\Delta\theta}{2} + b\sin(\Omega t + \phi)\right) \quad (4)$$

and the field strength $E_L$ of the light transmitted counterclockwise is given by:

$$E_L = E_o \sin\left(\omega t + \frac{\Delta\theta}{2} + b\sin(\Omega t)\right) \quad (5)$$

The two light beams having these field strengths are subjected to square-law detection in the light-receiving device 9. The output of the light-receiving device, $S(\Delta\theta, t)$, is given by:

$$E_o^2 \cos\left\{\Delta\theta + 2b \sin\frac{\phi}{2} \cos\left(\omega t + \frac{\phi}{2}\right)\right\} + \tag{6}$$

$$D.\ C.\ +\ \{\text{no less than } 2\omega\}$$

where D.C. denotes the dc component, and $\omega$ is the number of vibrations of light waves, with $2\omega$ representing a component having twice the number of vibration $\omega$. Such a fast signal cannot be detected by the light-receiving device 9 and hence is zero. The output signal from the light-receiving device 9 contains the phase-modulated component $\phi$, so the phase difference $\Delta\theta$ can be determined in association with the amplitude of the modulation signal.

If the dc component is eliminated, $S(\Delta\theta, t)$ can be rewritten in the form of a sum as follows:

$$E_o^2 \left[ \cos\Delta\theta \cos\left(2b \sin\frac{\phi}{2} \cos\left(\Omega t + \frac{\phi}{2}\right)\right) - \sin\Delta\theta \sin\left(2b \sin\frac{\phi}{2} \cos\left(\Omega t + \frac{\phi}{2}\right)\right) \right] \tag{7}$$

This can be expanded in terms of Bessel functions. By the expansion of the generating function of Bessel functions, we obtain:

$$\exp\frac{X}{2}\left(t - \frac{1}{t}\right) = \sum_{n=-\infty}^{\infty} J_n(X) t^n \tag{8}$$

If $t = \exp i\theta$, we obtain:

$$\exp i \times \sin\theta = \sum_{n=-\infty}^{\infty} J_n(X) e^{ni\theta} \tag{9}$$

By expanding the real and imaginary parts of equation (9), $S_s$ which is the sine part of $S(\Delta\theta, t)$ and $S_c$ which is its cosine part can be expanded into series. We define as follows;

$$S(\Delta\theta, t) = (S_c \cos\Delta\theta + S_s \sin\Delta\theta) E_o^2 \tag{10}$$

By performing conversion $\theta \rightarrow \theta + \pi/2$ and using the well known nature of Bessel functions, i.e., $$J_{-n}(X) = (-)^n J_n(X) \tag{11}$$

(where n is a positive integer), together with the following substitution:

$$\xi = 2b \sin\frac{\phi}{2} \tag{12}$$

We obtain:

$$S_c = J_0(\xi) - 2 \sum_{n=1}^{\infty} (-)^n J_{2n}(\xi) \cos 2n\Omega t \tag{13}$$

$$S_s = 2 \sum_{n=0}^{\infty} (-)^n J_{2n+1}(\xi) \cos(2n+1)\Omega t \tag{14}$$

By equations (13) and (14), the signal $S(\Delta\theta, t)$ can be rewritten as follows:

$$(dc \text{ component}) + (2\omega \text{ component}) + \tag{15}$$

$$2E_o^2 \sum_{n=1}^{\infty} (-)^n J_{2n}(\xi) \cos 2n\Omega t \cdot \cos\Delta\theta +$$

$$2E_o^2 \sum_{n=0}^{\infty} (-)^n J_{2n+1}(\xi) \cos(2n+1)\Omega t \sin\Delta\theta$$

This is the expansion of the modulation frequency $\Omega$ by harmonic waves. A desired harmonic component can be obtained by passage through a filter. If the first-order term of the expansion is designated the fundamental component P and the second-order term designated as the second harmonic component Q, the following equations can be obtained:

$$P(t) = 2 E_o^2 J_1(\xi) \cos\Omega t \sin\Delta\theta \tag{16}$$

$$Q(t) = 2 E_o^2 J_2(\xi) \cos 2\xi t \cos\Delta\theta \tag{17}$$

In most cases, the fundamental component P is detected to determine $\Delta\theta$. To attain a maximum sensitivity for P, $J_1(\xi)$ is maximized. To this end, the modulation index is set in such a way that $\xi = 1.8$. In this case, $J_0(\xi)$ is about 0.3.

The foregoing description concerns the basic construction of a phase modulated fiber-optic gyroscope operating.

When determining $\Delta\theta$ by detecting the fundamental component P, the modulation index $\xi$ must be held constant. Otherwise, the value of $J_1(\xi)$ will fluctuate. A method heretofore proposed for maintaining a constant value of modulation index consists of monitoring the second harmonic component Q to determine the value of $J_2(\xi)$. This method is described in Japanese Patent Application No. 59-244641. Signal $\Omega$ and signal $2\Omega$ which is an integral multiple of that signal are picked up from the drive circuit of a phase modulation device. The output of a light-receiving device is subjected to synchronous detection on the basis of these two signals. The detected output is passed through a low-pass filter to obtain a low-frequency component. The second harmonic component Q is:

$$Q = 2 E_o^2 J_2(\xi) \cos\Delta\theta \tag{18}$$

Since the modulation index $\xi$ must be held constant, the phase modulation device is controlled in such a way that Q is constant. In other words, $\xi$ is controlled to become 1.8. When $\xi$ is 1.8, $J_2$ is about 0.3. If $\xi$ becomes greater than 1.8, $J_2$ increases and vice versa. Hence, $\xi$ can be adjusted to 1.8 by holding constant.

If the quantity of light from the light-emitting device is constant, $\Delta\theta$ can be immediately determined from P(t) obtained by equation (16). In practice, however, the amplitude of the light, $E_0$, will fluctuate, so apparently different outputs will be produced for the same value of $\Delta\theta$ on account of fluctuations in the quantity of the light.

For the sake of simplicity, the foregoing discussion assumes that the two light beams, one transmitted clockwise and the other transmitted counterclockwise, have the same amplitude $E_0$. But this is not the case in practical situations. If it is necessary to distinguish the amplitudes of the two light beams, the amplitude of the light transmitted clockwise is written as $E_1$ and that of the light transmitted counterclockwise is written as $E_2$. In other words, the square of $E_0$ appearing in the previous discussion should be read $E_1E_2$.

JP-A-60-135816 (the term "JP-A" as used herein means an "unexamined published Japanese patent application") proposes a control system that provides a constant dc component in output signal. But the problem associated with the quantity of reflected light is not discussed in this patent. By the term "reflected light" is meant those components of light which are reflected from the edge faces of lenses, fiber and other parts of the optical system. These components will not contribute to the measurement of angular velocity but simply become noise. In contrast, signal light passes through the sensor coil and contributes to the measurement of angular velocity.

The light-receiving device receives both signal light and reflected light. The reflected light does not pass through the sensor coil. The control system described in JP-A-60-135816 assumes either the absence of reflected light or the presence of reflected light that will vary in the same way as does the signal light. Only in that case is valid the statement that holding the dc component constant is equivalent to controlling the amplitude of the light to be constant. In practice, however, a quantity of reflected light that is by no means negligible is launched into the light-receiving device. Reflected light will not fluctuate in the same way as does the signal light, or one may say that it will hardly fluctuate. The phase modulation index will also sometimes fluctuate. Therefore, holding the dc component constant does not necessarily result in a constant amplitude of the signal light.

As already mentioned, the prior art fiber-optic gyroscope suffers the problem that substantial variations occur in the quantity of light that is issued from the light-emitting device to be launched into the optical fiber cable. In other words, substantial variations can occur in the amplitude $E_0$. Thus, apparently different outputs will be produced for the same angular velocity on account of these variations in the quantity of light.

JP-A-61-147106 proposes a control system that is capable of maintaining a constant level of the dc component in the signal. JP-A-60-135816 already cited above proposes that the effects of variations in the quantity of light be cancelled by dividing the phase-modulated frequency component of the signal by the dc component. A phase-modulated fiber-optic gyroscope that operates with the second harmonic component controlled to be constant has also been proposed (see the already cited Japanese Patent Application No. 59-244641). The second harmonic component contains $J_2(\xi)$ and holding it constant was considered to be equivalent to controlling the phase modulation index to become constant. However, holding the dc component constant is by no means equivalent to controlling the quantity of light to be constant. The dc component contains $\Delta\theta$ in the form of $\cos\Delta\theta$. The invention described in Japanese Patent Application No. 59-244641 adopts the approximation of $\Delta\theta \simeq 0$ and controls the dc component to become constant on the assumption that it is proportional to the intensity of the light issuing from the light-emitting device. However, $\Delta\theta$ sometimes has such a great magnitude that it cannot be neglected. If $\Delta\theta$ is substantial, the approximation of $\Delta\theta \simeq 0$ will produce inaccuracies.

The approach of maintaining a constant value of the second harmonic component in order to hold the phase modulation index constant has the following problems. As equation (17) shows, the second harmonic component has not only the $J_2(\xi)$ term but also the $\cos\Delta\theta$ term. The second harmonic component is held constant on the basis of the approximation that $\Delta\theta$ is nearly equal to zero. However, this approximation is by no means exact if $\Delta\theta$ is great. This will eventually result in failure to maintain a constant value of the phase modulation index.

Dividing the fundamental component by the dc component will cause the following additional problems. The dc component D of the light of interference which is the output of the light-receiving device can be written as:

$$\frac{1}{2}(E_1^2 + E_2^2) + E_1E_2J_0(\xi)\cos\Delta\theta + H \tag{218}$$

where H is the quantity of reflected light. If the modulated frequency component in equation (16) is eliminated and if $E_0^2$ is rewritten as $E_1E_2$, the fundamental component P is given by:

$$P = 2E_1E_2J_1(\xi)\sin\Delta\theta \tag{219}$$

In order to obtain correct results by dividing the fundamental component by the dc component, the following assumptions must be taken into account in addition to the problem of reflected light:

Assumption 1: There are no variations in the ratio of the quantity of the light transmitted clockwise to the quantity of the light transmitted counterclockwise;

Assumption 2: There are no variations in the phase modulation index.

If assumption 1 holds, $$E_2/E_1 = K \tag{220}$$

The dc component D can be rewritten as:

$$\frac{1}{2B}(1+K^2)E_1^2 + KE_1^2J_0(\xi)\cos\Delta\theta \tag{221}$$

where the quantity of reflected light H is neglected. By dividing the fundamental component P by the dc component D, we obtain:

$$\frac{P}{D} = \frac{2KJ_1(\xi)\sin\Delta\theta}{\frac{1}{2}(1+K^2) + KJ_0(\xi)\cos\Delta\theta} \tag{222}$$

and the resulting output is independent of the quantity of the light emerging from the light-emitting device. Since K and $J_0(\xi)$ are known, $\Delta\theta$ can be determined. However, this relationship is established only when the above-mentioned assumptions hold and they are impractical.

Further, determination of $\Delta\theta$ from equation (222) involves quite complicated mathematical operations. This equation is by no means simple to deal with. One should also remember that the foregoing discussion disregards the quantity of the light inherent in the dc component.

SUMMARY OF THE INVENTION

The principal object, therefore, of the present invention is to solve the aforementioned problems of the prior art and to realize measurements of angular velocity in a more correct and consistent way.

A specific object of the present invention is to provide a phase modulated fiber-optic gyroscope that is capable of maintaining a constant value of phase modulation index by minimizing the variations that will occur in the quantity of the light issuing from a light-emitting device.

In the present invention, phase difference $\Delta\theta$ is detected by the following procedure:

(1) Determine the dc component D from the output of a light-receiving device and subtract a preset quantity of reflected light H from D to obtain a dc component R that is solely composed of signal light:

$$R = D - H \quad (19)$$

(2) Perform synchronous detection on the output of the light-receiving device to obtain the fundamental component P or an appropriate harmonic component, and eliminate the amplitude term by dividing the detection output by R to determine the correct value of $\Delta\theta$.

The quantity of reflected light is contained only in the dc component. The fundamental component and harmonics such as the second and fourth harmonics do not contain the quantity of reflected light. In order to avoid any problem associated with the quantity of reflected light, the present invention does not use the dc component.

The fundamental component P and harmonics of any order have the same coefficient with respect to the quantity of the light issuing from the light-emitting device. Hence, the coefficient with respect to the quantity of light can be cancelled by dividing the fundamental component P by harmonics. By dividing the fundamental component by harmonics of odd-numbered orders, $\Delta\theta$ will disappear. If, on the other hand, the fundamental component is divided by harmonics T of even-numbered orders, the result will be in the form of tan $\Delta\theta$. In this way, P/T will produce an output that is insensitive to disturbances such as fluctuations in the quantity of reflected light and in the output of the light-emitting device. The relationship between the output and $\Delta\theta$ is not only stable but also simple.

In the present invention, two harmonics of even-numbered orders, Q and T, are necessary. The first harmonic component Q helps maintain a constant value of the phase modulation index by being adjusted to zero (Q=0). The other harmonic component T provides the denominator by which the fundamental component P is divided. Any harmonics will suffice if they are of even-numbered orders. For the purpose of the following discussion, Q is assumed as the second harmonic component and T as the fourth harmonic component.

The fiber-optic gyroscope of the present invention may operate on the following principles:

(1) the gyroscope which is either at rest or rotating at an adequately small angular velocity is recognized by a signal coming either from the gyroscope itself or from another sensor;

(2) if the above condition is satisfied, the output of the light-emitting device is so controlled that the dc component of the output from the light-receiving device is held constant; and (3) if the above condition is satisfied, the phase modulation index is so controlled that the second harmonic component of the output from the light-receiving device is held constant.

The phase modulated fiber-optic gyroscope of the present invention also has the following operational features:

(1) the fundamental component P is determined;

(2) a harmonic component Q of an even-numbered order is determined;

(3) another harmonic component T of an even-numbered order is determined;

(4) Q is adjusted to zero; and (5) calculate P/T to determine $\Delta\theta$ in the form of tan $\Delta\theta$.

DETAILED DESCRIPTION OF THE PREFERRED EMBODIMENTS

Figure 2:
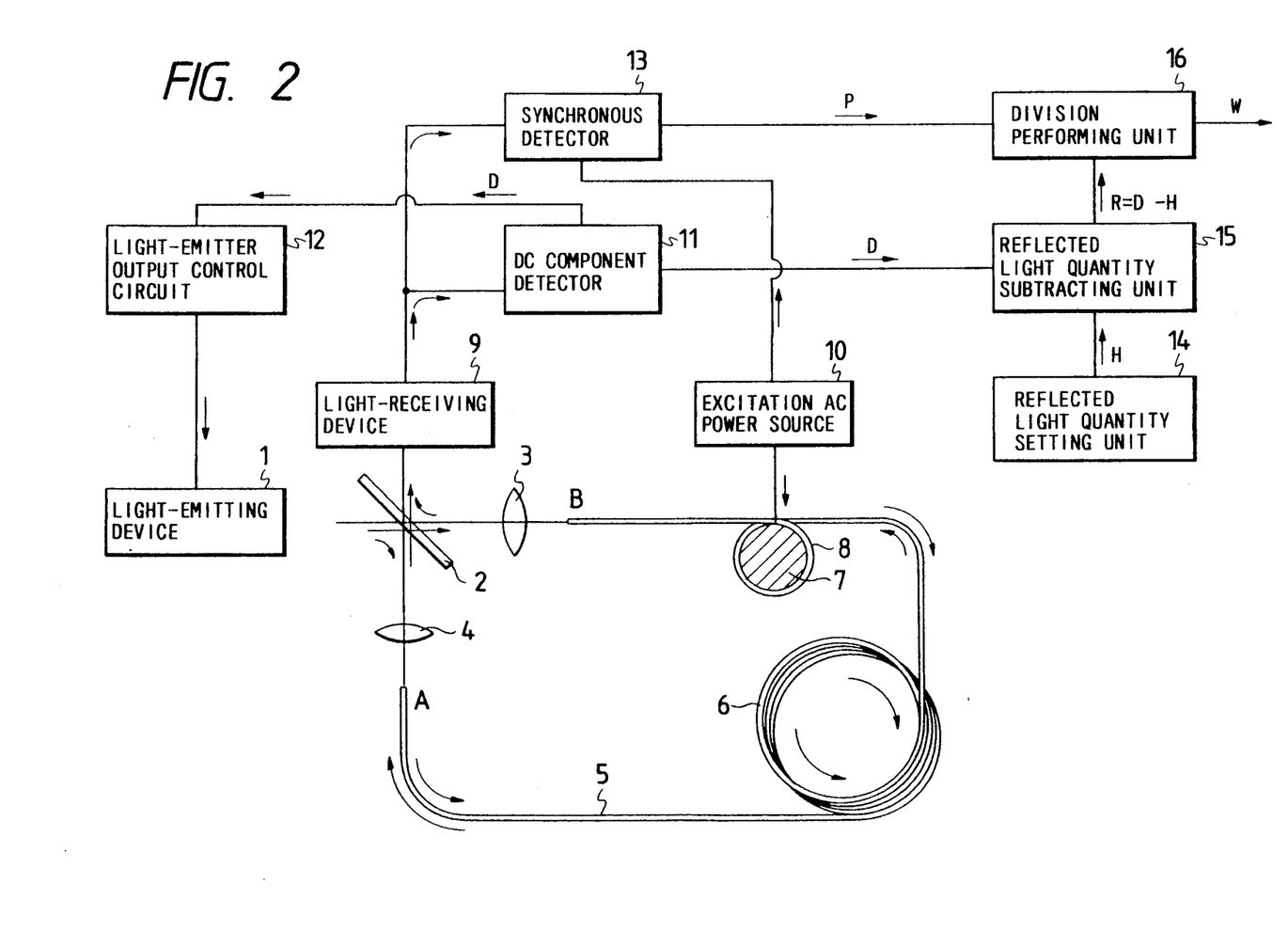
FIG. 2 shows one example of the basic construction of the phase modulated fiber-optic gyroscope of the present invention.

An example of the basic construction of the phase modulated fiber-optic gyroscope of the present invention is described hereunder with reference to FIG. 2. Coherent light issuing from a light-emitting device is split into two beams by a beam splitter 2. The two beams are converged by lenses 3 and 4 and launched at opposite ends A and B of an optical fiber cable 5. The optical fiber cable 5 consists of a single-mode fiber and is composed of a sensor coil 6 made of many turns of the optical fiber and a portion 8 wound onto a phase modulation device 7.

The light beam launched at end B is transmitted through the sensor coil 6 clockwise and emerges at end A. The light beam launched at end A is transmitted through the sensor coil 6 counterclockwise and emerges at end B. The emerging two light beams are recombined by the beam splitter 2 and launched as a single beam into a light-receiving device 9.

The phase modulation device 7 positioned close to one end of the optical fiber cable 5 comprises a piezoelectric device that has electrodes to which an ac voltage is applied to cause it to expand or contract in such a way as to change the optical path length of the cable wound about said modulation device.

An excitation ac power source 10 drives the phase modulation device 7 at a modulation frequency $\Omega$.

The output from the light-receiving device 9 contains various components such as the dc component, the fundamental component and harmonics. Reflected light is contained only in the dc component.

A dc component detector 11 picks up the dc component from the output of the light-receiving device. A light emitter output control circuit 12 controls the drive current through the light-emitting device 1 in such a way that the dc component detector 11 will produce a constant output.

The dc component in the output from the light-receiving device contains a portion that is to serve as signal light, as well as a portion derived from reflected light. Since the quantity of reflected light is constant, the portion which is to serve as signal light can be held constant by maintaining the dc component in the output of the light-receiving device at a constant level.

A synchronous detector 13 performs synchronous detection on the output of the light-receiving device in response to a sync signal from the excitation ac power source 10 to obtain a signal component of an appropriate order. It is desirable to obtain either the fundamental component P or a harmonic component of an odd-numbered order since they contain $\Delta\theta$ in the sine term.

The construction described above is completely the same as in the prior art phase modulated fiber-optic gyroscope.

What is characteristic of the fiber-optic gyroscope of the present invention is that it further includes a reflected light quantity setting unit 14, a reflected light subtracting unit 15 and a division performing unit 16.

The reflected light quantity setting unit 14 presets the quantity of reflected light H. The reflected light quantity subtracting unit 15 subtracts the quantity of reflected light H from the dc component D which is the output of the dc component detector 11, to thereby determine a signal dc component R. The division performing unit 16 divides the output of the synchronous detector 13 by the signal dc component R and produces a corrected output W. Since W does not contain the amplitude of the light, the phase difference $\Delta\theta$ can be determined from the result of the foregoing operations.

As in the prior art fiber-optic gyroscope, the light-receiving device 9 produces as its output the light of interference between the light beam that was transmitted clockwise and the light beam that was transmitted counterclockwise. Suppose here that the synchronous detector 13 detects the fundamental component P. If the amplitudes of the two light beams are written as $E_1$ (clockwise) and $E_2$ (counterclockwise), the fundamental component P obtained from the output of the light-receiving device is given by:

$$P = 2 E_1 E_2 J_1(\xi) \sin\Delta\theta \quad (20)$$

The dc component D of the output from the light-receiving device is:

$$\frac{1}{2}(E_1^2 + E_1^2) + E_1 E_2 J_0(\xi)\cos\Delta\theta + H \quad (21)$$

where H is the quantity of reflected light which occurs as a result of reflection at the entrance ends of the fiber cable and in other areas when the two light beams are transmitted clockwise and counterclockwise. In the actual optical system, $E_1$ is substantially equal to $E_2$, so the following assumption will hold:

$$\frac{1}{2}(E_1^2 + E_2^2) \simeq E_1 E_2 \quad (22)$$

As already mentioned, $\xi$ is often set at an approximate value of 1.8 in order to maximize $J_1(\xi)$. For this approximate value, $J_0(\xi)$ is nearly equal to 0.3. In this case, the dc component D is:

$$D \simeq E_1 E_2 (1 + 0.3 \cos\Delta\theta) + H \quad (23)$$

When the fiber-optic gyroscope is at rest or its rotation is negligible, $\Delta\theta = 0$ and hence $\cos\Delta\theta = 1$. Thus, under these conditions, the dc component D is:

$$D \simeq 1.3 E_1 E_2 + H \quad (24)$$

The dc component D of the output from the light-receiving device is the sum of the dc component of signal light R and reflected light H ($D = R + H$). If the correct value of H is preset in the reflected light quantity setting unit 14, R can be obtained by subtracting H from D in the reflected light quantity subtracting unit 15. Thus, $$R \simeq 1.3 E_1 E_2 \quad (25)$$

This is one of the most important points of the present invention.

The fundamental output P of the synchronous detector is given by equation (20). The division performing unit 16 divides P by R as follows:

$$\frac{P}{R} = \frac{2 E_1 E_2 J_1(\xi)\sin\Delta\theta}{1.3 E_1 E_2} \quad (26)$$

$$= \frac{2}{1.3} J_1(\xi)\sin\Delta\theta \quad (27)$$

$$\simeq 0.85 \sin\Delta\theta \quad (28)$$

This division operation produces a result that is independent of the amplitude of the light. In equation (28), $\xi$ is assumed to have the specific value of 1.8 but this may be replaced by any other value. Coefficients are generally expressed as follows in terms of Bessel functions:

$$\frac{2 J_1(\xi)}{1 + J_0(\xi)} \quad (29)$$

The result is independent of the amplitude of the light since the quantity of reflected light H was subtracted from the dc component D. Otherwise, the residual amplitude-to-H ratio will preclude the exact determination of $\Delta\theta$.

The basic construction of a fiber-optic gyroscope that satisfies the essential conditions for operation on the principle of phase modulation is described in detail in Ezekiel S. and Arditty H. J., "Fiber Optic Rotation Sensors", Springer-Verlag, Berlin, 1982.

An embodiment of the present invention is described below with reference to FIG. 3. The components which are the same as those shown in FIG. 2 are identified by like numerals and will not be described in detail.

A light shielding device 20 such as an electric shutter is provided between the optical fiber cable and either one of the two lenses into which the split light beams are to be launched. The light-shielding device 20 is opened or closed by means of a drive 21. The light-shielding device 20 is open when an angular velocity measurement is conducted. Only when the quantity of reflected light is measured is the light-shielding device 20 is closed to interrupt the optical path between the lens and the fiber cable in such a way that signal light will not be launched into the light-receiving device 9 but that only the reflected light is launched into said device. The incident dc component accounts for the quantity of reflected light H. The operation of the drive 21 for the light-shielding device 20 such as an electronic shutter may be controlled by a simple signal such as a contact signal delivered from a digital control unit.

The quantity of reflected light H as detected by the dc component detector 11 passes through a multiplexer 22 in a digital processing unit 19 and is converted to a digital value by an A/D converter 23. The resulting digital value is stored in a suitable memory device connected to a bus 26. An oscillator 10 produces an oscillating voltage that causes the piezoelectric device to expand or contract.

Figure 3:
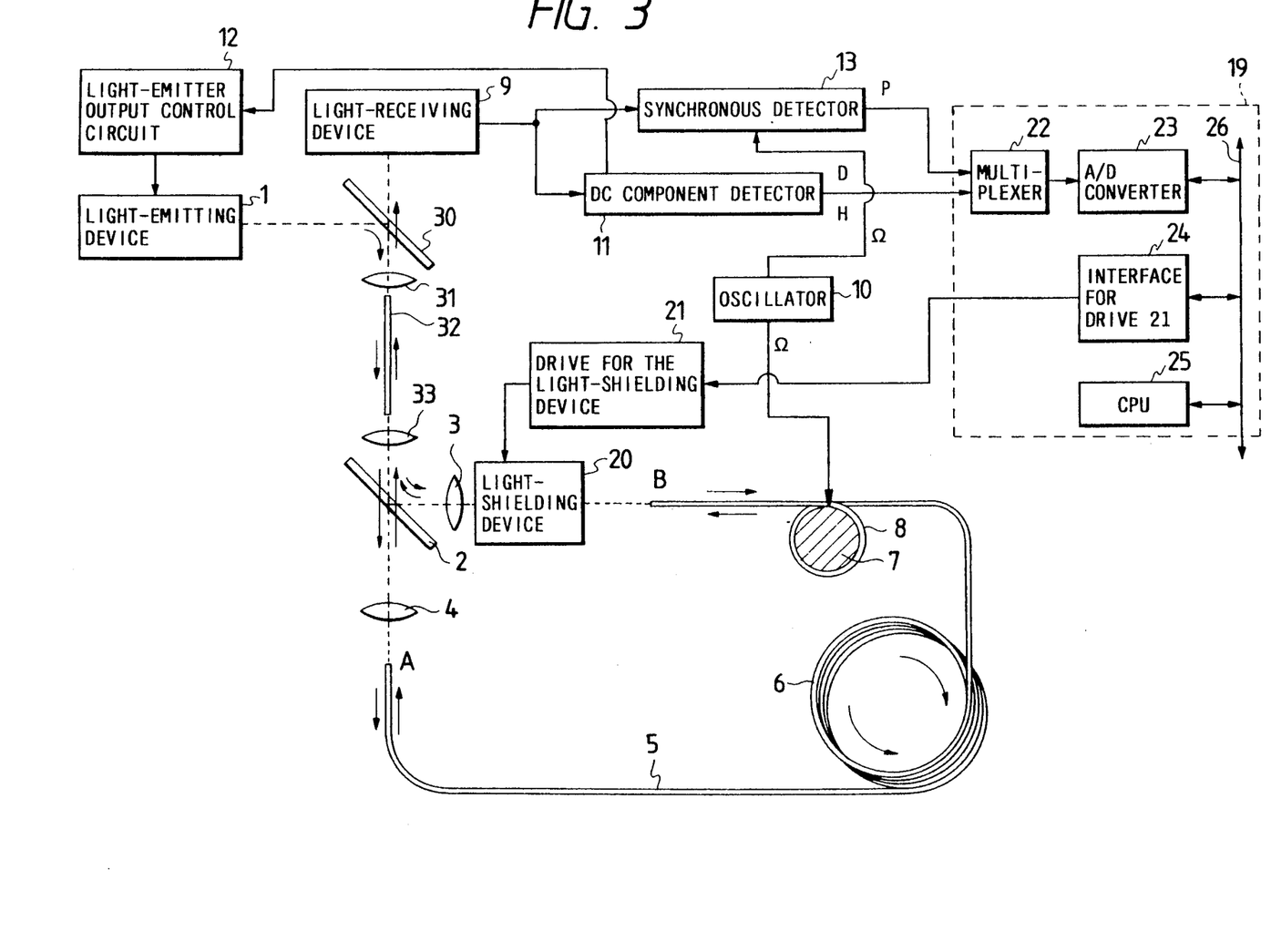
FIG. 3 shows diagrammatically an embodiment of the present invention.

The reflected light quantity setting unit 14 shown in FIG. 2 includes the light-shielding device 20, the drive 21 for the light-shielding device 20, the dc component detector 11 and the digital processing unit 19 which are shown in FIG. 3.

The reflected light quantity setting unit 14 has to determine the quantity of reflected light and store it in a suitable memory, so it may be composed of an analog circuit. In this alternative case, a capacitor of large capacity may be used as a memory device. The analog circuit produces a voltage output and has the advantage of simple configuration.

Since the quantity of reflected light H is desirably determined when the fiber-optic gyroscope is at rest, the memory for the quantity of reflected light has to store the correct value of H for the time period defined by one stop of the gyroscope and another stop. If this time period is long, digital circuit is preferred over an analog circuit.

In the example under consideration, the dc component detector 11, multiplexer 22 and the A/D converter 23 are used to determine and store the dc component during normal angular velocity measurements. These components are utilized in the reflected light quantity setting unit 14. Reference numeral 24 indicates a interface for drive 21.

CPU 25 calculates P/R to determine the phase difference $\Delta\theta$.

Various other designs may be employed to construct the reflected light quantity setting unit 14.

It sometimes occurs that the output produced from the light-receiving device when light is blocked by the light-shielding device 20 cannot be considered to directly represent the quantity of reflected light in the presence of signal light. In this case, the output is multiplied by an appropriate coefficient. When the light-shielding device 20 is positioned close to end B of the fiber cable, the light reflected from that end when the device 20 is closed will not be launched into the light-receiving device. It may be necessary to compensate for this phenomenon.

The quantity of reflected light H can also be determined by calculations. The dc component D is the sum of $(1+\cos\Delta\theta)$ due to signal light and H, so H can be estimated by determining D as a function of $\Delta\theta$. If H is a constant, it may be used to achieve better (more exact) approximations.

In the example shown in FIG. 3, a half mirror 30, lenses 31 and 33 and a constant polarizing fiber 32 are additionally inserted between the fiber cable 5 and each of the light-emitting device and the light-receiving device. The purpose of adding these components is to achieve alignment between the polarized plane of the light transmitted clockwise and that of the light transmitted counterclockwise and it has nothing to do with the principal object of the present invention.

Figure 4:
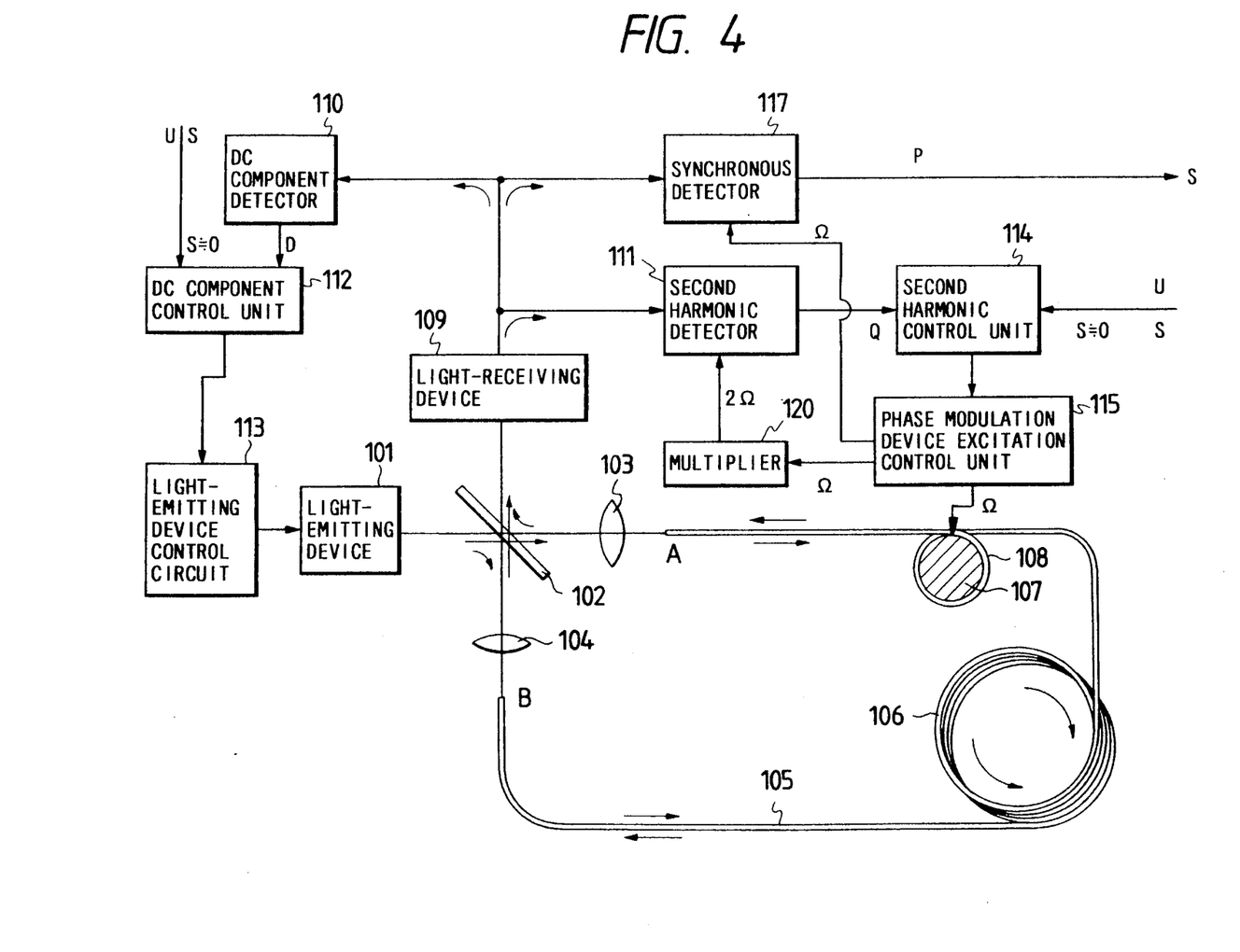
FIG. 4 shows another example of the basic construction of the fiber-optic gyroscope of the present invention.

FIG. 4 shows another example of the basic construction of the phase modulated fiber-optic gyroscope of the present invention. A light-emitting device 101 is a light source of coherent light and may be composed of any apparatus such as a semiconductor laser, a superluminescent diode or gas laser. A beam splitter 102 divides the coherent light from the light-emitting device 101 into two light beams. The term "beam splitter" is used herein to mean a light dividing device in its broad sense. The two split light beams are converged by lenses 103 and 104 and launched into an optical fiber cable 105 at opposite ends A and B. The optical fiber cable 105 is made of a single-mode optical fiber and includes a sensor coil 106 consisting of many turns of the optical fiber and a portion 108 wound around a phase modulation device 107. The sensor coil detects the angular velocity of rotation.

The phase modulation device 107 comprises a piezoelectric device, typically in cylindrical form, that is provided with electrodes on an outside and an inside surface and around which the optical fiber cable is wound. The phase modulation device 107 imparts periodic phase changes to the light being transmitted through the fiber-optic cable.

Between the electrodes are provided a modulation voltage of a frequency $\Omega$ from a phase modulation device excitation control unit 115. The amplitude of the applied voltage is proportional to the phase modulation index.

The light beam launched at end A is transmitted clockwise through the sensor coil 106, whereas the light beam launched at end B is transmitted counterclockwise. The two light beams emerging from the fiber-optic cable are re-combined by the beam splitter 102 and are launched as a single beam into a light-receiving device 109. The light-receiving device 109 detects the intensity of the light of interference and produces it as an output. The output from the light-receiving device contains the dc component D, the fundamental component P, the second harmonic component Q and harmonics of higher orders.

The dc component D is detected by a dc component detector 110. The detected signal is sent to a dc component control unit 112. The dc component is used to stabilize the output of the light-emitting device but it does not always control the latter. It is used to control the output of the light-emitting device only if a stop signal U is applied from another sensor or when the final output S of the gyroscope per se is zero.

The dc component control unit 112 supplies a light-emitting device control circuit 113 with a drive current W for the light-emitting device. The control unit 112 controls the dc component D of the output from the light-receiving device in such a way that said dc component is held constant when a stop signal U is supplied or when the final output S is zero. It should, however, be noted that the stop signal U need not refer to a "stop" in the strict sense of the term and a state close to "stop"

may also be indicated. The same is true with the final output S and it need only be close to zero.

The dc component control unit 112 stores the dc component D when the gyroscope is either stopped or in a state close to stop; it then compares the stored dc component with a predetermined value Do and supplies a command to the light-emitting device output control circuit 113 so that the stored dc component will approach the predetermined value Do.

The fundamental component P of the output from the light-receiving device 109 is detected by the synchronous detector 117. A sync signal is supplied from the phase modulation device excitation control unit 115. The second harmonic component Q of the output from the light-receiving device 109 is detected by a second harmonic detector 111. The modulation signal from the control unit 115 is doubled in a multiplier 120 to produce a sync signal.

The modulation index of the control unit 115 is controlled in such a way as to provide a constant level of the second harmonic component. The modulation index is theoretically expressed by b but since it is proportional to $\xi$, $\xi$ may also be designated the modulation index. The second harmonic component is not always controlled to be constant. Only when a stop signal U is supplied from another sensor or if the final output S from the gyroscope is either equal or close to zero is the second harmonic component controlled to become equal to a predetermined value $Q_0$.

Such an intermittent control is performed by a second harmonic control unit 114. The gyroscope which is at rest or in a state very close to it is identified by the supply of either a stop signal from another sensor or a substantially zero output S from the gyroscope. The value of the second harmonic component Q in that instance is adopted by the control unit 114 which compares it with $Q_0$ and supplies the modulation index $\xi$ of the phase modulation device excitation control unit 115 in such a way that the difference between Q and Qo will be minimized.

The fundamental component P appears as the output of the synchronous detector 117, which serves as the final output S. This is equivalent to equation (16) except that the vibration term is eliminated:

$$S = P = 2 E_0^2 J_1(\xi) \sin\Delta\theta \tag{118}$$

By controlling the dc component to be constant, the intensity of the light $E_0^2$ can be held constant. By controlling the second harmonic component to be constant, the phase modulation index $\xi$ can be held constant. Thus, the coefficients in equation (118) are held constant, and $\Delta\theta$ can be determined from the final output S in the form of $\sin\Delta\theta$.

In the foregoing discussion, the second harmonic component is detected and controlled to be constant in order to maintain a constant level of the phase modulation index. It should, however, be noted that in place of the second harmonic component, the third or fourth harmonic component may be controlled to be constant in order to maintain a constant level of the phase modulation index. This is possible since all the harmonics of interest contain the phase modulation index.

In the previous discussion of the operation of the fiber-optic gyroscope based on phase modulation, the amplitudes of the two light beams transmitted clockwise and counterclockwise were collectively written as $E_0$ without being distinguished from each other. In the discussion that follows, th amplitude of the light transmitted clockwise is written as $E_1$ and that of the light transmitted counterclockwise is written as $E_2$. Thus, $E_0^2$ appearing in the previous discussion should in all instances be read $E_1E_2$.

The dc component D of the output from the light-receiving device can be rewritten as:

$$\frac{1}{2}(E_1^2 + E^2) + E_1E_2 J_0(\xi)\cos\Delta\theta \tag{119}$$

In the actual optical system, the amplitude of the light transmitted clockwise is substantially equal to that of the light transmitted counterclockwise as expressed below:

$$E_1 \simeq E_2 \tag{120}$$

Thus, the following assumption will hold:

$$\frac{1}{2}(E_1^2 + E_2^2) \simeq E_1 E_2 \tag{121}$$

The modulation index $\xi$ may assume any value but here a special case is considered. In order to maximize the sensitivity for the fundamental component, the first-order Bessel function $J_1(\xi)$ need be maximized, with $\xi$ selected at a value of approximately 1.8. In this case, the zero-order Bessel function $J_0(\xi)$ is approximately 0.3. The dc component D is therefore written as:

$$D = E_1 E_2 (1 + 0.3 \cos\Delta\theta) \tag{122}$$

When the fiber-optic gyroscope is either at rest or nearly at rest, $$\Delta\theta \simeq 0 \tag{123}$$

$$\cos \Delta\theta \simeq 1 \tag{124}$$

Hence, when the gyroscope is either at rest or nearly at rest, $$D = 1.3 E_1 E_2 \tag{125}$$

and by controlling D to become equal to the predetermined $D_0$, the quantity of the light of interference, $E_1E_2$, can be held constant. This is accomplished by the dc component detector 110, the dc component control unit 112, the light-emitting device output control circuit 113, and other associated components shown in FIG. 4.

We now describe the control of the second harmonic component Q, which is given by:

$$Q = -2E_1 E_2 J_2(\xi) \cos\Delta\theta \tag{126}$$

In equation (126), $E_1E_2$ which is the quantity of light issuing from the light-emitting device is already constant. When the gyroscope is either at rest or in a state very close to it, $\cos\Delta\theta$ is unity. In this case, $$Q = -2E_1 E_2 J_2(\xi) \tag{127}$$

The excitation voltage to be applied to the phase modulation device excitation control unit 15 is so controlled as to bring Q to a constant value. If the phase modulation index $\xi$ can be controlled to be constant, the final output S or the fundamental component P is expressed as follows from equation (118):

$$S = P = 2 E_1 E_2 J_1(\xi) \sin \Delta\theta \qquad (128)$$

The coefficients preceding $\sin\Delta\theta$ are invariable constants and the exact value of $\Delta\theta$ can be determined from the output S. This effect can never be attained simply by controlling the quantity of light or the modulation index alone.

Figure 5:
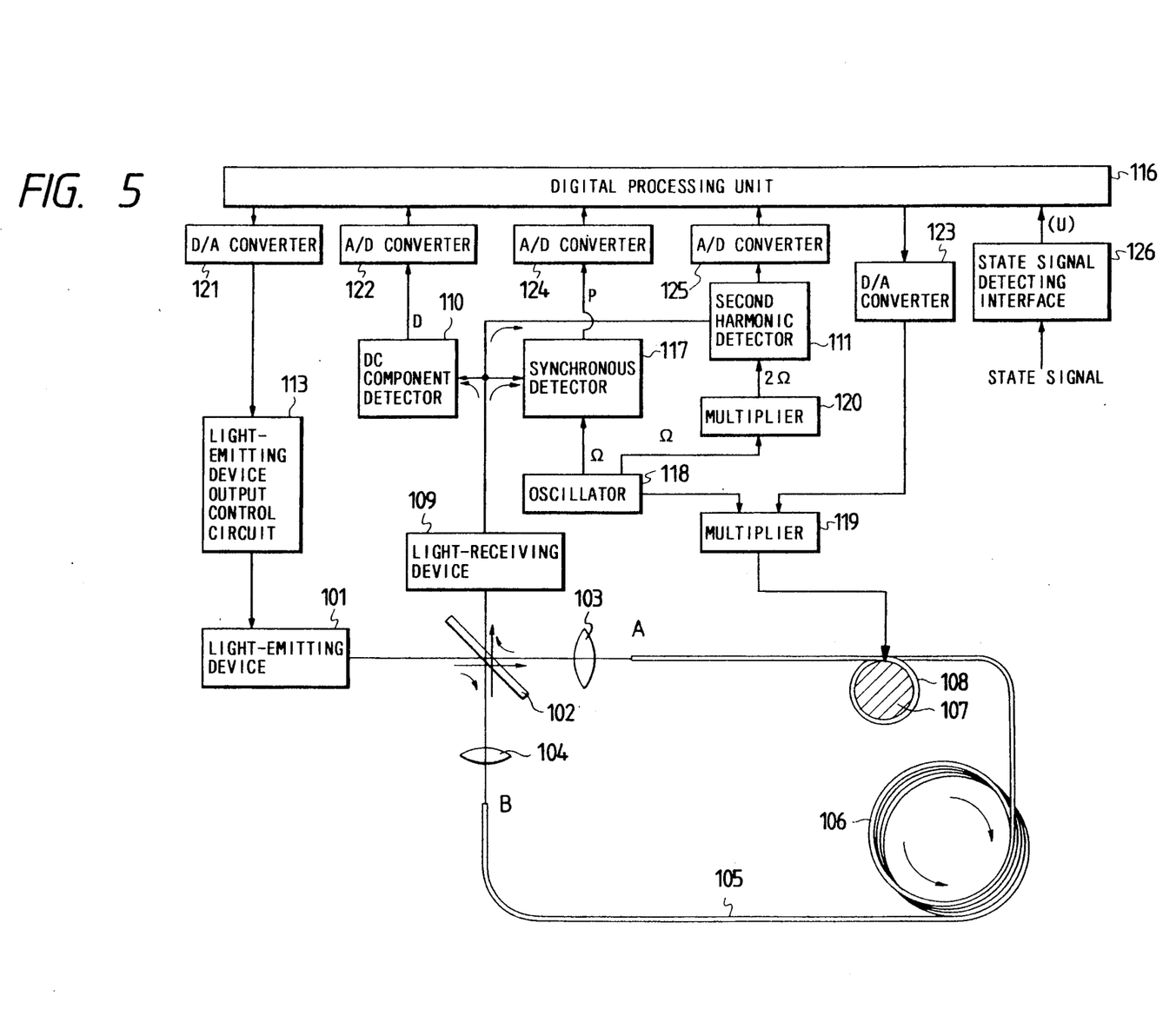
FIG. 5 shows diagrammatically another embodiment of the present invention.

FIG. 5 shows another embodiment of the present invention which employs the construction shown in FIG. 4. The components which are the same as those shown in FIG. 4 are identified by like numerals and will not be described in detail.

The dc component detector 110 is supplied with the output from the light-receiving 109 and produces the dc component of said output as a voltage signal, which is converted to a digital signal in an A/D converter 122.

When the gyroscope receives a stop signal from another sensor or in response to a zero or nearly zero final output S from the gyroscope per se, the following operations are performed. A control signal for controlling the quantity of the light issuing from the light-emitting device in such a way that the dc component D becomes equal to the preset value $D_0$ is calculated and constructed. This control signal is converted to an analog signal in a D/A converter 121 and supplied to the light-emitting device output control circuit 113.

When the gyroscope is rotating at fast speed, the control signal constructed for the previous case where the gyroscope was at rest is retained and delivered as an output. Since it is handled as a digital signal by a digital processing unit 116, the control signal can be easily retained and continuously supplied as an output.

In response to this control signal, the light-emitting device output control circuit 113 controls the quantity of the light emerging from the light-emitting device.

An oscillator 118 generates a modulation signal having a frequency $\Omega$. The output of the oscillator 118 is fed to a multiplier 119 where it is amplified by an appropriate factor. The amplified phase modulation signal is applied to the electrodes of the phase modulation device 107. Hence, $\xi$ or the modulation index b which is to be provided by the phase modulation device 107 can be freely adjusted by controlling the factor of amplification with the multiplier 119.

In response to the sync signal $(f=\Omega)$ from the oscillator 118, the synchronous detector 117 elicits the fundamental component P from the output of the light-receiving device. The fundamental component P is fed to an A/D converter 124 and thence supplied into the digital processing unit 116.

Multiplier 120 multiplies the phase modulation signal from the oscillator 118 to form a sync signal having a frequency of $2\Omega$. In response to the sync signal $(f=2\Omega)$ from the multiplier 120, the second harmonic detector 111 detects the second harmonic component Q of the output from the light-receiving device. The detected signal is fed to an A/D converter 125 where it is converted to a digital signal which is thereafter supplied to the digital processing unit 116.

When the fiber-optic gyroscope is at rest or in a state very close to it, the digital processing unit 116 recognizes this situation either by its own final output S or in response to a stop signal U supplied from another sensor. In the latter case, a state signal from another sensor is supplied into the digital processing unit 116 through a state signal detecting interface 126. The digital processing unit 116 then determines as to whether the applied state signal indicates that the gyroscope is at rest and if this is the case, a stop signal U is constructed. Alternatively, another sensor may itself produce a stop signal U when the gyroscope is at rest, which stop signal is then supplied into the digital processing unit 116. Of course, the gyroscope may itself produce a final output S which is nearly equal to zero.

When the fiber-optic gyroscope is at rest or in a state very close to it, the digital processing unit 116 performs the following two operations. First, it compares the dc component D with the preset reference $D_0$ and controls the output of the light-emitting device in such a way that the difference is minimized. The control signal is supplied into the light-emitting device output control unit 113 through the D/A converter 121. Second, the processing unit compares the second harmonic component Q with the preset reference $Q_0$ and controls the phase modulation index $\xi$ in such a way that the difference is minimized. The control signal is supplied into the multiplier 119 through the D/A converter 123.

When the gyroscope is rotating at high speed, the values of the dc component and the second harmonic component for the previous case where the gyroscope was at rest are retained by the processing unit, which keeps supplying the respective values to the control unit 113 and the multiplier 119.

The angular velocity of the rotating gyroscope can be determined from the fundamental component P.

Figure 6:
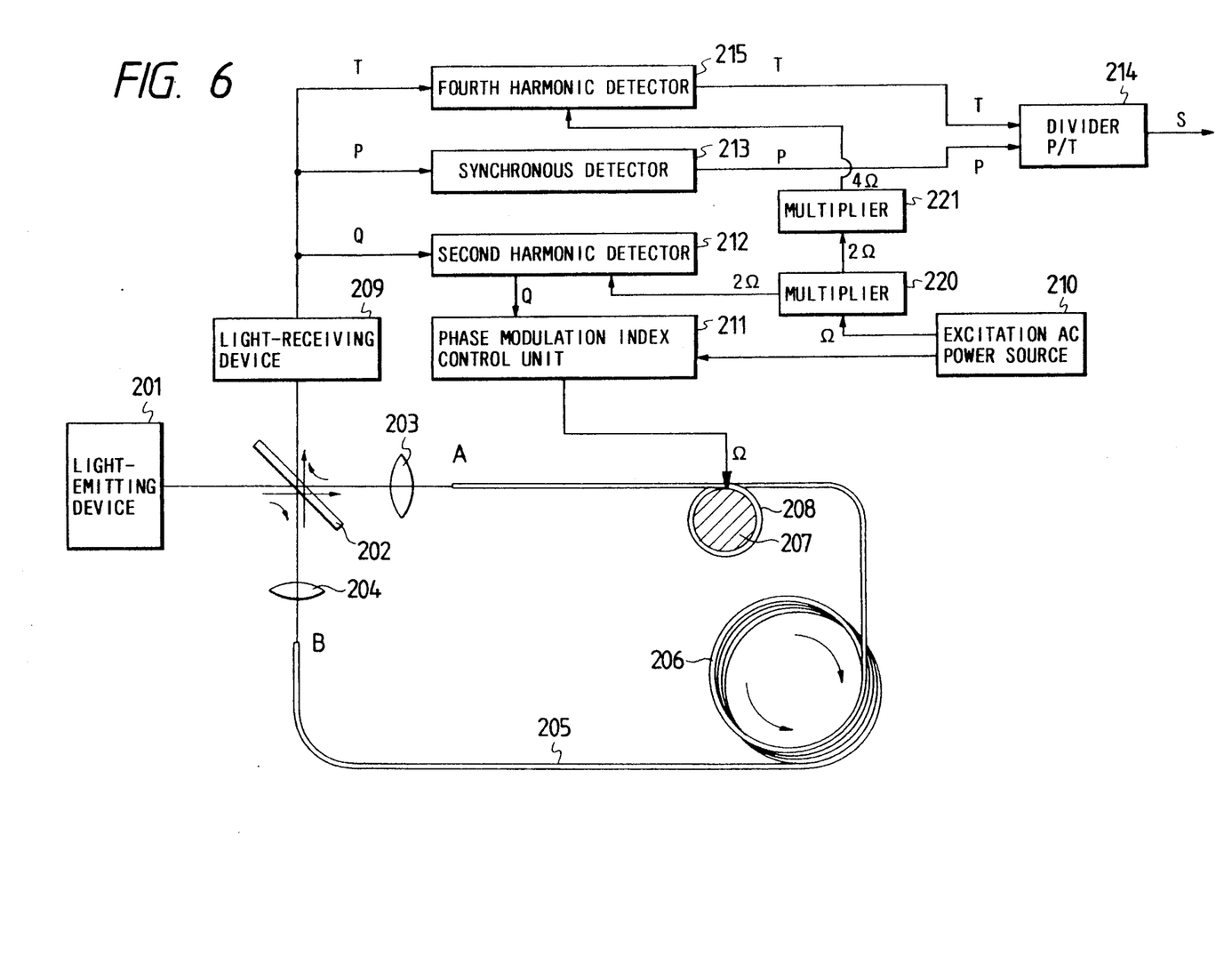
FIG. 6 shows still another example of the basic construction of the fiber-optic gyroscope of the present invention.

FIG. 6 shows still another example of the basic construction of the phase-modulated fiber-optic gyroscope of the present invention. A light-emitting device 201 is a light source of coherent light and may be composed of any suitable apparatus such as a semiconductor laser, a super-luminescent diode or a gas laser. The emerging coherent light is split into two beams with a light dividing device 202 such as a beam splitter. The two split beams are converged by lenses 203 and 204 and launched into an optical fiber cable 205 at opposite ends A and B. The optical fiber cable 205 is made of a single-mode fiber and consists of a sensor coil 206 and a portion 8 which is wound around a phase modulation device 207. The sensor coil 206 consists of many turns of the optical fiber and performs angular velocity detection.

The phase modulation device 207 comprises a piezo-electric device, typically in cylindrical form, around which the fiber cable is wound and that has a voltage applied between electrodes on opposite and faces. When an ac voltage having a modulation frequency of $\Omega$ is applied to the electrodes, the phase of the light being transmitted through the fiber-optic cable changes periodically at the frequency $\Omega$. An excitation ac power source 210 applies a modulating voltage to the phase modulation device 207 through a phase modulation index control unit 211.

The light beam launched into the optical fiber cable 205 at end A is transmitted through the sensor coil 206 clockwise, whereas the light beam launched at end B is transmitted counterclockwise. The emerging light beams are recombined by the light dividing device 202.

The intensity of the light of interference is subjected to square-law detection by a light-receiving device 209. Since the phase modulation device 207 is positioned asymmetrically with respect to the sensor coil 206, the output from the light-receiving device contains the fundamental component at the modulation frequency Ω and all harmonics.

As already described, the nth-order harmonic component contains as coefficients Bessel functions up to the nth order and the square of the amplitude of the light. The nth-order harmonic contains $\Delta\theta$ as a sine function if n is odd-numbered and a cosine function if n is even-numbered.

A synchronous detector 213 detects the fundamental component P from the output of the light-receiving device. A sync signal is obtained from the excitation ac power source 210. A second harmonic detector 212 detects the second harmonic component Q from the output of the light-receiving device. The signal from the excitation ac power source 210 is multiplied by two in a multiplier 220 to obtain a sync signal having the frequency 2Ω. The second harmonic detector 212 controls the phase modulation index b of the phase modulation index control unit 211 in such a way that Q becomes zero. Since $\xi$ and b satisfy a certain relationship, $\xi$ will hereunder be referred to simply as the phase modulation index.

A fourth harmonic detector 215 detects the fourth harmonic component T from the output of the light-receiving device. The 2Ω signal from the multiplier 220 is further doubled in a multiplier 221 to construct a sync signal having the frequency 4Ω which is to be used in synchronous detection.

A divider 214 divides the fundamental component P by the fourth harmonic component T to produce an output S.

The basic operation of the fiber-optic gyroscope shown in FIG. 6 need not be described in detail. The synchronous detector 213 detects the fundamental component P from the output of the light-receiving device:

$$P = 2 E_1 E_2 J_1(\xi) \sin \Delta\theta \qquad (223)$$

The fourth harmonic detector 215 detects the fourth harmonic component T from the output of the light-receiving device:

$$T = 2 E_1 E_2 J_4(\xi) \cos \Delta\theta \qquad (224)$$

The divider 14 divides the fundamental component P by the fourth harmonic component T:

$$\frac{P}{T} = \frac{J_1(\xi)}{J_4(\xi)} \tan \Delta\theta \qquad (225)$$

Equation (225) does not contain the amplitude of the light, so the result of the division will not be influenced by any fluctuations in the quantity of the light issuing from the light-emitting device. Further, the dc component is not used as the denominator and hence the problem associated with the quantity of reflected the light can be avoided. However, the coefficient on the right side of equation (225) is a function of the phase modulation index $\xi$. If nothing is done about this, the coefficient can change in response to any variation in the phase modulation index. Therefore, in the present invention, the second harmonic component Q is held at a constant level, say, zero:

$$Q = -2 E_1 E_2 J_2(\xi) \cos \Delta\theta \qquad (226)$$

To adjust Q to zero means $J_2(\xi) = 0$. Bessel functions have many zero points. The second-order Bessel function also has many zero points and any one of them will suffice. Since the value of $\xi$ is fixed at a certain zero point, the values of the first- and fourth-order Bessel functions $J_1(\xi)$ and $J_4(\xi)$ will become constant. In other words, the coefficient on the right side of equation (225) becomes constant and hence the phase difference $\Delta\theta$ can be uniquely determined by this equation.

Figure 7:
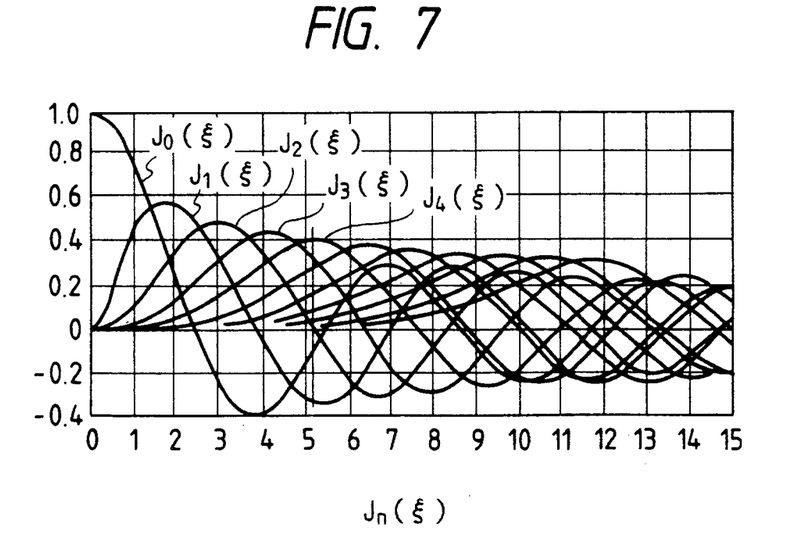
FIG. 7 is a graph showing the profiles of Bessel functions of various orders.

FIG. 7 is a graph showing the profiles of Bessel functions of various orders. The second-order Bessel function $J_2(\xi)$ first becomes zero at 5.1 and this is called the first zero point. At 5.1, the values of $J_1(\xi)$ and $J_4(\xi)$ are $-0.35$ and 0.4, respectively. With these values, the coefficient on the right side of equation (225) is $-0.85$ and determined definitely.

Any zero point can of course be adopted. The Bessel functions have the following characteristic: between two adjacent zero points of the Bessel function of a certain order, a zero point of the Bessel function of a different order always exists. There is also a rule called "sum rule" about the Bessel functions and this rule states that the sum of the squares of the Bessel functions added together for all orders is always equal to unity. Therefore, in the vicinity of a zero point of the second-order Bessel function, a Bessel function of a close order assumes a greater value. This is also true with the case under consideration. In the vicinity of the first zero point ($\xi = 5.1$), the first- and fourth-order Bessel functions $J_1(\xi)$ and $J_4(\xi)$ assume greater values and their derivatives are small. In other words, a variation in $\xi$ will hardly influence the values of these Bessel functions. Since the coefficient on the right side of equation (225) does not change easily, the sensitivity of $\Delta\theta$ determination will not change. In the present invention, the variation in $\xi$ is deliberately suppressed by adjusting Q to a zero. Should there be any variation, the present invention insures that the resultant influence will be minimized. Thus, in the present invention, not only the effects of variations in the quantity of the light issuing from the light-emitting device but also those fluctuations in the phase modulation index can be totally eliminated.

A further advantage of the present invention lies in the simplicity of mathematical operations. They are not as complicated as in equation (222) and the final result S can be obtained in the form of $\tan\Delta\theta$. It is easy to determine $\Delta\theta$ from $\tan\Delta\theta$. If $\Delta\theta$ is very small, $$\tan\Delta\theta \simeq \Delta\theta \qquad (227)$$

and this makes it much easier to determine $\Delta\theta$.

Figure 8:
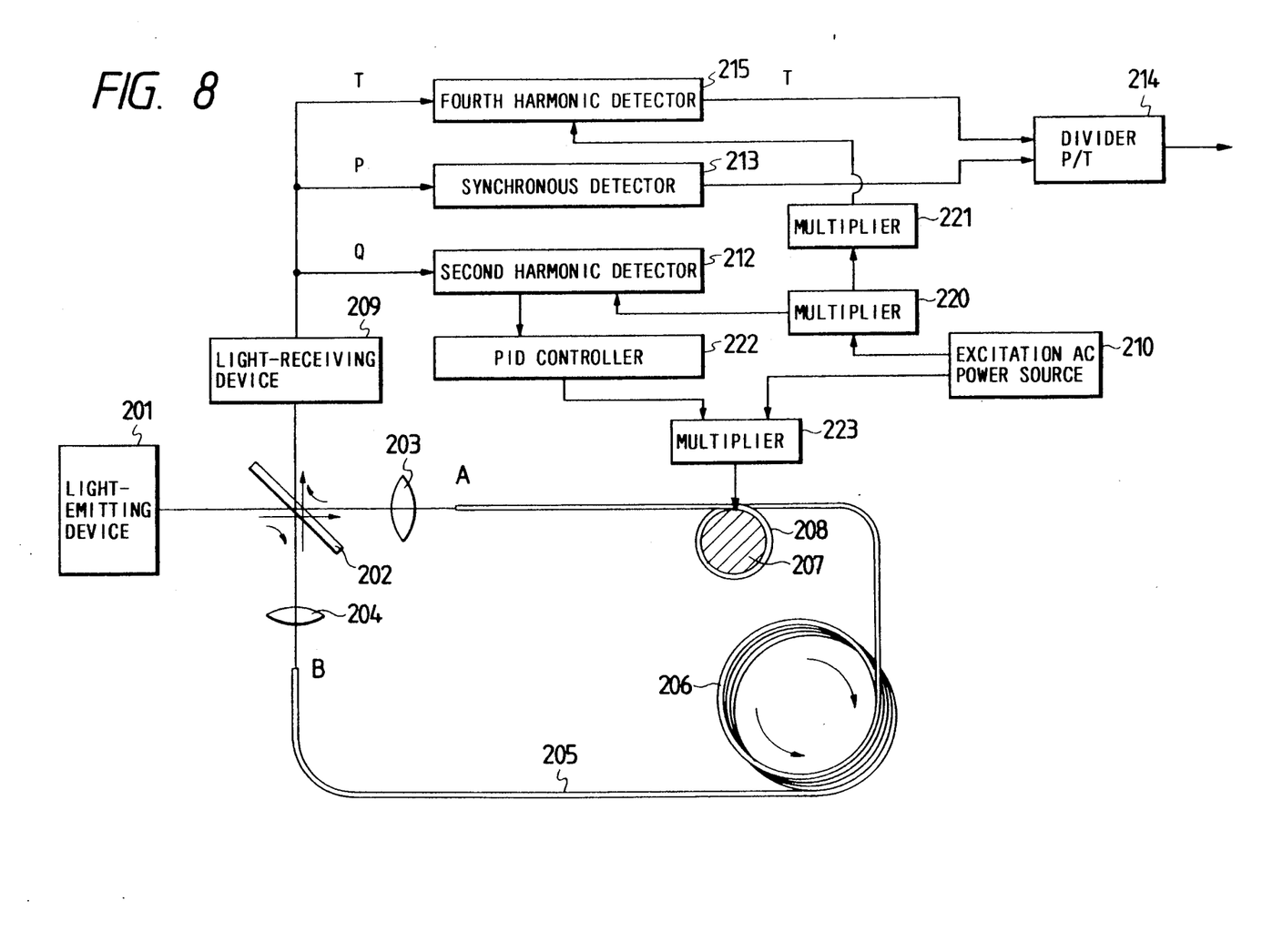
FIG. 8 shows diagrammatically still another embodiment of the present invention.

FIG. 8 shows still another embodiment of the present invention. The components which are the same as those shown in FIG. 6 are identified by like numerals and are not described in detail. The phase modulation index control unit 211 is composed of a PID controller 222 and a multiplier 223. The second harmonic detector 212 detects the second harmonic component Q. PID controller 222 compares Q with the value zero and controls the phase modulation index in such a way that the difference is minimized. The output of the PID controller 222 is supplied to the multiplier 223 as a signal for determining the multiplying factor. The multiplier 223 supplies the phase modulation device with the output signal from the excitation ac power source 210 after it is multiplied by the multiplying factor This insures the phase modulation index to be held constant.

As will be apparent from the foregoing explanation, the fiber-optic gyroscope of the present invention has the following advantages. First, it is capable of eliminating any effect that is caused by temperature- or time-dependent variations in the quantity of the light beams to be coupled. Second, there is no problem associated with the quantity of reflected light since the dc component is not used. Third, a simple result can be attained by dividing the fundamental component by a harmonic component of an even-numbered order. The mathematical operations involved are also easy to perform. Fourthly, the phase modulation index is held constant by adjusting another harmonic component of an even-numbered order to zero, and this safeguards against any temperature- or time-dependent variations in phase modulation index. Hence, the gyroscope of the present invention enables angular velocity measurements to be performed in an exact and consistent way. Fifthly, the reflected light caused by lenses, optical fiber and other components of the optical system is rejected from the dc component of the output of the light-receiving device so as to determine the true dc component of signal light. Therefore, the exact value of the phase difference $\Delta\theta$ can be obtained even if there are variations in the amplitude of the signal light, and this also enables angular velocity measurements to be performed in an exact and consistent way. Sixthly, when the gyroscope is at rest or in a state very close to it, the dc component and the second harmonic component of the output from the light-receiving device are compared with the respective predetermined values and the differences are controlled to become minimal. In this way, the output from the light-emitting device and the phase modulation index can always be held constant. Thus, according to the present invention, any temperature- or time-dependent variations in the quantity of the light beams to be coupled and in the phase modulation index can be adequately compensated to insure that angular velocity measurements are always performed in an exact and consistent manner.

What is claimed is:

1. A phase-modulated fiber-optic gyroscope for measuring the angular velocity of a moving object, comprising:
    phase modulation means;
    fiber-optic cable means having both ends thereof, said fiber-optic cable means comprising a sensor coil and a portion provided with said phase modulation means;
    light-emitting means for emitting coherent light;
    beam splitter means for splitting the coherent light from said light-emitting means into two beams which are launched at the both ends of said fiber-optic cable means, and for re-combining the light beams transmitted through said fiber-optic cable means;
    light-receiving means for receiving from the both ends of said fiber-optic cable means the light beams that have been transmitted through said fiber-optic cable means and that are re-combined by said beam splitter means;
    synchronous detector means which receiving an output signal from said light-receiving means for detecting a phase-modulated frequency component of the output signal of said light-receiving means;
    DC component detector means that receives the output signal of said light-receiving means for detecting DC component of the output signal thereof;
    reflected light quantity setting means for presetting a level of a reflected light quantity in the DC component which do not pass through said sensor coil;
    reflected light quantity subtracting means for subtracting the reflected light quantity set by said reflected light quantity setting means from an output signal of said DC component detector means; and
    division performing means for dividing an output signal of said synchronous detector by an output signal of said reflected light quantity subtracting means to output the result of the division.

2. A phase-modulated fiber-optic gyroscope as claimed in claim 1, wherein said DC component detector means comprises:
    means for detecting the DC component from the output signal of said light-receiving means; and
    DC component level holding means which detects that the gyroscope is nearly at rest for holding the level of the DC component for the case where the gyroscope is nearly at rest.

3. A phase-modulated fiber-optic gyroscope as claimed in claim 1 or 2, wherein said reflected light quantity setting means comprises means for supplying a predetermined voltage equivalent to the reflected light quantity.

4. A phase-modulated fiber-optic gyroscope as claimed in claim 1 or 2, wherein said reflected a light quantity setting means comprises:
    light-shielding means provided between said sensor coil and said beam splitter means for controlling the passage of light in the path therebetween;
    means for driving said light-shielding means; and
    processing means which detects the output signal of said DC component means for the case where the passage of light is blocked by said light-shielding means for holding and outputting the detected output signal.

5. A phase-modulated fiber-optic gyroscope for measuring the angular velocity of a moving object, comprising:
    phase modulation means;
    fiber-optic cable means having two ends thereof, said fiber-optic cable means comprising a sensor coil and a portion provided with said phase modulation means;
    light-emitting means for emitting coherent light;
    beam splitter means for splitting the coherent light from said light-emitting means into two beams which are launched at both ends of said fiber-optic cable means, and for re-combining the light beams transmitted through said fiber-optic cable means;
    light receiving means for receiving from the two ends of said fiber-optic cable means the light beams that have been transmitted through said fiber-optic cable means and that are re-combined by said beam splitter means;
    first synchronous detector means which receives an output signal from said light-receiving means for detecting a phase-modulated frequency component of the output signal of said light-receiving means;
    DC component detector means that receives the output signal of said light-receiving means for detecting a DC component of the output signal thereof;
    second synchronous detector means for detecting a harmonic component having a frequency which is an even integral multiple of the phase modulation frequency; and means for controlling the output signal of said light-emitting means and a phase modulation index to bring the DC component and the even harmonic component in the case where the gyroscope is nearly at rest, close to respective predetermined values.

6. A phase-modulated fiber-optic gyroscope as claimed in claim 5, further comprising means for detecting the DC component of the output signal from said light-receiving means when the gyroscope is nearly at rest, and for controlling the output signal of said light emitting means so that a level of the held DC component is held constant.

7. A phase-modulated fiber-optic gyroscope as claimed in claim 5 or 6, further comprising means for maintaining a second harmonic component Q of the output signal from said light-receiving means when the gyroscope is nearly at rest, and for controlling the phase modulation index so that a level of the second harmonic component Q is held constant.

8. A phase-modulated fiber-optic gyroscope for measuring the angular velocity of a moving object, comprising:
 phase modulation means;
 fiber-optic cable means having two ends thereof, said fiber-optic cable means comprising a sensor coil and a portion provided with said phase modulation means;
 light-emitting means for emitting coherent light;
 beam splitter means for splitting the coherent light from said light-emitting means into two beams which are launched at the ends of said fiber-optic cable means, and for re-combining the light beams transmitted through said fiber-optic cable means;
 light receiving means for receiving from the two ends of said fiber-optic cable means the light beams that have been transmitted through said fiber-optic cable means and that are re-combined by said beam splitter means;
 first synchronous detector means which receives an output signal from said light-receiving means for detecting a phase-modulated frequency component of the output signal of said light-receiving means;
 second synchronous detector means for detecting a harmonic component having a frequency which is a fourth numbered multiple of the output of the phase modulation frequency from the output signal of said light receiving means;
 third synchronous detector means for detecting a second harmonic component of the output signal from said light-receiving means;
 divider means for dividing a phase-modulated frequency component detected by said first synchronous detector means by the harmonic component detected by said second synchronous detector means to output the result of the division;
 second harmonic detector means for detecting a harmonic component having a frequency twice the phase modulation frequency with the harmonic component detected by the second synchronous detector means being anything but the second harmonic; and
 phase modulation index control means for controlling the phase modulation index to hold the second harmonic component to zero.

* * * * *